United States Patent
Kuerner et al.

(10) Patent No.: US 11,297,162 B2
(45) Date of Patent: Apr. 5, 2022

(54) CONTROL MODULE, CONFIGURATION SYSTEM, METHOD FOR USE AND MOTOR VEHICLE CONTROL UNIT

(71) Applicant: FLEX AUTOMOTIVE GMBH, Filderstadt (DE)

(72) Inventors: Rainer Kuerner, Dettingen/Erms (DE); Uwe Burkhardt, Lichtenstein (DE)

(73) Assignee: Flex Automotive GmbH, Filderstadt (DE)

( * ) Notice: Subject to any disclaimer, the term of this patent is extended or adjusted under 35 U.S.C. 154(b) by 102 days.

(21) Appl. No.: 16/606,280

(22) PCT Filed: Apr. 13, 2018

(86) PCT No.: PCT/EP2018/059530
§ 371 (c)(1),
(2) Date: Oct. 18, 2019

(87) PCT Pub. No.: WO2018/192853
PCT Pub. Date: Oct. 25, 2018

(65) Prior Publication Data
US 2021/0112142 A1 Apr. 15, 2021

(30) Foreign Application Priority Data
Apr. 19, 2017 (EP) .................................... 17167064

(51) Int. Cl.
*H04L 67/00* (2022.01)
*H04L 67/12* (2022.01)

(52) U.S. Cl.
CPC .............. *H04L 67/34* (2013.01); *H04L 67/12* (2013.01)

(58) Field of Classification Search
CPC ................................ H04L 67/34; H04L 67/12
See application file for complete search history.

(56) References Cited

U.S. PATENT DOCUMENTS

| | | | | |
|---|---|---|---|---|
| 2006/0278455 | A1* | 12/2006 | Padginton | A63G 25/00 180/193 |
| 2008/0017426 | A1* | 1/2008 | Walters | F41H 7/044 180/89.1 |

(Continued)

FOREIGN PATENT DOCUMENTS

| | | |
|---|---|---|
| DE | 102005051246 A1 | 5/2007 |
| EP | 0950936 A1 | 10/1999 |
| WO | 2014/056593 A1 | 4/2014 |

OTHER PUBLICATIONS

Anonymous: "Programmable Logic Controller—Wikipedia", Apr. 18, 2017, XP055412208, Gefunden im Internet: URL: https://en.wikipedia.org/w/index.php?title=Programmable_logic_controller&oldid=76100646 {gefunden am Oct. 3, 2017}, Selten 1 1-3.

*Primary Examiner* — Normin Abedin
(74) *Attorney, Agent, or Firm* — Volpe Koenig

(57) ABSTRACT

The invention relates to a control module for use in motor vehicles, comprising a plurality of signal inputs, a plurality of signal outputs, a central storage unit which is connected to at least one functional unit for further processing incoming signals. A signal identification number can be assigned to the at least one signal coming into the central storage unit such that the signal can be identified and further used by the at least one functional unit. The at least one functional unit can be exchanged in a modular manner. The invention additionally relates to a system for configuring the control module, to a method for using the control module, and to a motor vehicle control unit comprising the control module.

11 Claims, 1 Drawing Sheet

(56) References Cited

U.S. PATENT DOCUMENTS

2016/0163133 A1\* 6/2016 Ricci ................... A61B 5/0077
                                                       701/33.4
2017/0263125 A1\* 9/2017 Tanabe .................. G08G 1/161

\* cited by examiner

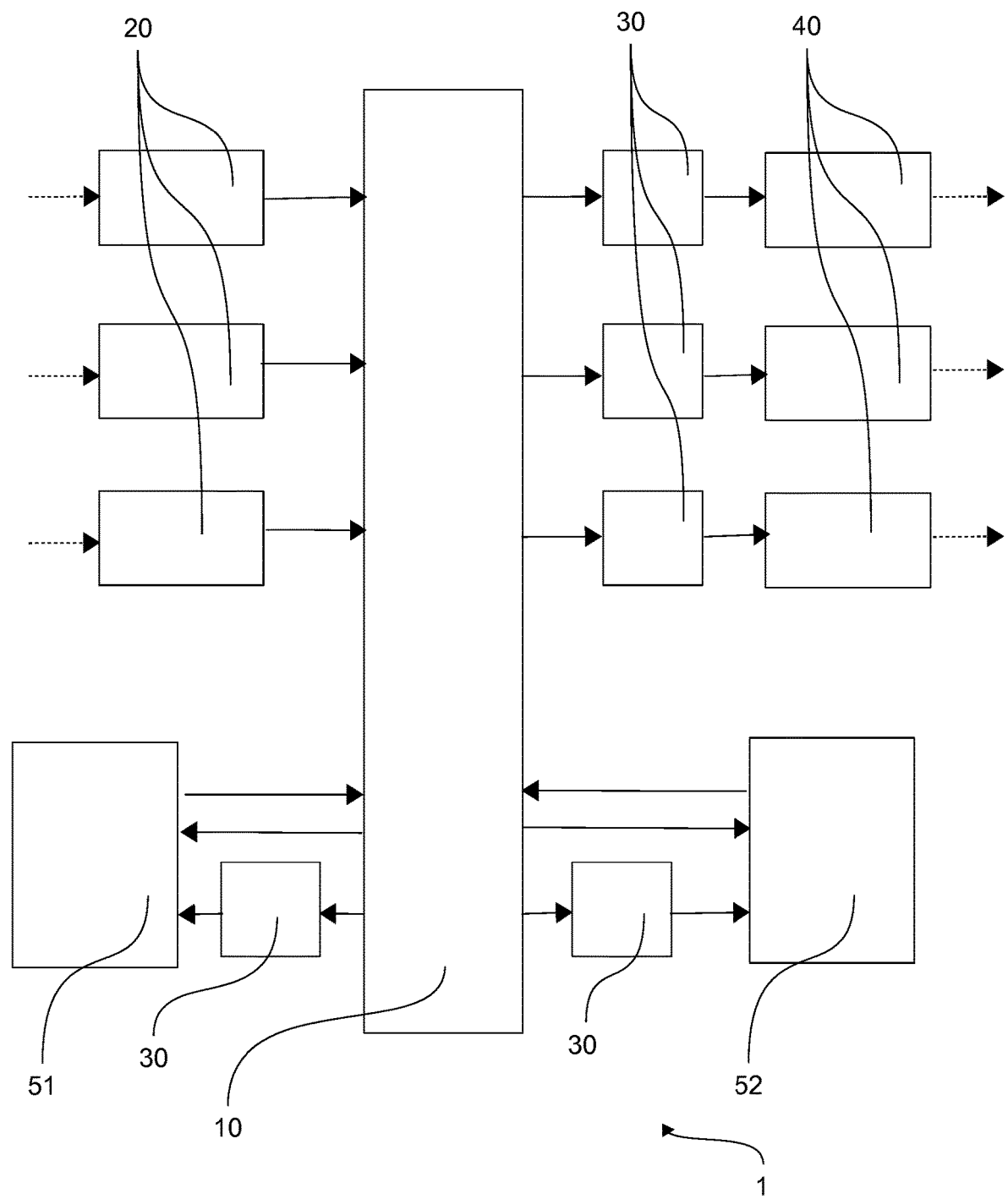

CONTROL MODULE, CONFIGURATION SYSTEM, METHOD FOR USE AND MOTOR VEHICLE CONTROL UNIT

CROSS REFERENCE TO RELATED APPLICATIONS

This application is a 371 application of International Patent Application No. PCT/EP2018/059530, filed Apr. 13, 2018, which claims priority to European Patent Application No. 17167064.9 A, filed Apr. 19, 2017, both of which are incorporated herein by reference as if fully set forth.

FIELD OF INVENTION

The present disclosure relates to a control module for use in motor vehicles, and more particularly to a system for configuring a control module, a method for use, and a motor vehicle control unit.

BACKGROUND

Control modules are used in vehicles in order to be able to, among other things, configure special functions according to individual, application-specific needs. Control modules are thus used in commercial vehicles such as for example police cars, fire trucks, taxis, vehicles for disabled occupants and/or patient transport or otherwise specialized commercial vehicles. The control module thereby makes it possible to configure a standard motor vehicle so as to provide one or more special functions. If needed, additional control elements may also be provided in conjunction with the control module to that end.

Currently available control modules, however, require specifically gearing the configuration of the special functions to the respective application for each of the individual applications. Due to the complexity of available control modules, the application-specific configuration must be undertaken by the manufacturer of the control module. The control module is installed into the respective commercial vehicle with a fixed configuration. Adaption by the commercial vehicle manufacturer, for example, is not intended.

SUMMARY

It is the task of the present invention to provide a control module for use in motor vehicles which is easy to use and also enables simple maintenance, provides a connection to different signal sources as well as being economical to manufacture and easy to configure. A further task of the invention is specifying a system for configuring the control module, a method for using the control module, and a motor vehicle control unit having such a control module.

According to the present invention, the task is solved by a control module for use in motor vehicles, particularly special-purpose vehicles, which comprises a plurality of signal inputs, a plurality of signal outputs and a central memory. The central memory is connected to at least one functional unit for the further processing of incoming signals. Moreover, at least one signal received in the central memory is assignable a signal identification number in such a manner that the signal can be identified and used further by the at least one functional unit. The at least one functional unit is modularly interchangeable.

BRIEF DESCRIPTION OF THE DRAWINGS

FIG. 1 is a structural embodiment of a control module for use in commercial vehicles according to the present disclosure.

DETAILED DESCRIPTION OF THE PREFERRED EMBODIMENTS

A control module for use in motor vehicles, particularly special-purpose vehicles, which comprises a plurality of signal inputs, a plurality of signal outputs and a central memory is disclosed. The central memory is connected to at least one functional unit for the further processing of incoming signals. Moreover, at least one signal received in the central memory is assignable a signal identification number in such a manner that the signal can be identified and used further by the at least one functional unit. The at least one functional unit is modularly interchangeable.

A signal can refer in particular to a response from a sensor, a key such as e.g. a function key, a lever position or the like. The central memory is preferably suited to storing/saving digital and/or analog signals. The central memory thus enables the accessing of a signal received in said central memory at a later point in time. The central memory can in particular be designed as a data storage. In the sense of the present invention, a signal can also alternatively be understood as a data signal or, respectively, data in general. Thus, the control module can preferably process and make further use of both analog as well as digital signals or data signals respectively.

According to the invention, the central memory is designed such that an incoming signal can be assigned a signal identification number. Preferably, a signal is assigned such an identification number upon being received in the central memory so that the signal is clearly distinguishable from other stored/saved signals within the central memory. A respective identification number/signal identification number is assignable particularly in the case of the central memory designed as a digital storage. This thereby ensures that a signal can also be reliably identified and read from among a plurality of signals at a later point in time.

To be understood as a functional unit in the sense of the present invention is a unit suited to the processing, further processing, conditioning, etc. of a signal. In particular, the at least one functional unit is designed so as to be able to identify and further process a signal stored or saved in the central memory. The at least one functional unit is expediently connected to the central memory to that end. Thus, a signal from the central memory is readable by the functional unit as well as a result of the functional unit transmittable to the central memory. To that end, the central memory can exhibit outputs and inputs for connection to the at least one functional unit. The functional unit can in particular be provided in modular form.

In the context of the present invention, the central memory can be understood as a memory fully accessible by all of the provided functional units. The distinct association of signals to functional units ensues on the basis of the signal identification number to be assigned. A functional unit can thus only read those signals assigned to it by way of the signal identification number. The functional unit and the central memory are preferably connectable to each other in a modular way. Thus, a single functional unit can be exchangeable or replaceable according to the application-specific requirements of a commercial vehicle to be specifically configured.

According to one embodiment of the present invention, the central memory is connected to a plurality of functional units. In particular, the central memory has a plurality of inputs and outputs for suitably connecting to a plurality of functional units. Thus, any number of special functions can be provided in a special-purpose vehicle or commercial vehicle respectively through the use of multiple functional units. A functional unit can, depending on the assigned signal identification number, retrieve and/or further process a signal stored or saved in the central memory. Furthermore, a functional unit result can be fed back or respectively returned to the central memory, whereby the functional result can be expediently relayed or respectively transmitted by a signal output of the central memory into a central vehicle control, for example, or to a special function of the commercial vehicle. A special function of the commercial vehicle is thus controllable on the basis of the result of the at least one functional unit.

In a further embodiment, the at least one signal can be used further by multiple functional units in parallel. Preferably, a signal received in the central memory and identified by a signal identification number can be retrievable by multiple functional units. In this sense, the full access of each functional unit to the central memory is explicit, whereby each respective functional unit reads out or further uses only those signals with signal identification numbers assigned to it. The signal, e.g. a sensor or a key or the like, can in this way be (further) applicable to a plurality of functional units. It is thus for example possible to use a central control member like a function key so that multiple functional units process the respective signal after its receipt in the central memory.

A further embodiment provides for at least one of the signal inputs and at least one of the signal outputs to be designed as an CAN, LIN, USB, WLAN, LAN and/or Bluetooth interface. Thus, signal input/signal output configurations commonly used in motor vehicles are in particular provided for the inventive control module. Hence, a plurality of e.g. sensors in combination with the inventive control module can be used within a motor vehicle. The signal inputs and/or signal outputs can be designed as analog and/or digital interfaces.

According to one embodiment, the functional units each comprise a filter such that a signal can be linked to a status condition of the motor vehicle. The at least one filter is preferably connected upstream of the at least one functional unit. The at least one filter unit can to that end be provided at a signal input/signal output of the at least one functional unit. The at least one filter or the at least one filter unit respectively is thus provided between the central memory and the functional unit. The filter in particular enables the calling up or respectively further use of a signal stored in the central memory by a functional unit to be additionally linked to, for example, a vehicle status. Moreover conceivable is linking to other preconditions within the environment of a motor vehicle by means of the filter or filter unit respectively. With the at least one filter function, a precondition can be set for a functional unit's further use of a signal. A defined state in which a signal is usable or respectively not usable by a functional unit is thus definable on the basis of the filter function. In this sense, the filter can be provided as a configurable filter, particularly a parameterizable filter. Thus, a plurality of same-type filters can be used for a plurality of functional units, whereby the filters are specifically configurable for the respectively associated functional unit.

In the sense of the present invention, the filter can be understood as a filter unit able to be assigned to a functional unit. A functional unit can thus comprise a filter, or filter unit respectively, able to be configured or respectively replaced independently of the functional unit. The filter/filter unit is in particular assigned in each case to one functional unit. Alternatively, the filter unit can be integrated into the functional unit.

It can furthermore be provided for filters or filter units respectively to be connected upstream of the central memory signal outputs. A signal output can thereby be allocated a filter unit in such a manner that the filter unit is arranged between the central memory and the signal output or signal output interface respectively. The sending of e.g. a functional unit result from the central memory can in this way be made selectively dependent on a precondition such as a vehicle state or other references. A vehicle state or vehicle status respectively can be, for example, a temperature, a dynamic driving condition, a sensor setting or the like.

In terms of the present invention, it is preferentially provided for the control module to be suited to the (further) processing of signals in order to control in particular special functions of a commercial vehicle. An efficient and simple modification of a standard motor vehicle can thus be advantageously provided so as to obtain a suitable commercial vehicle.

In the context of the present invention, the processing of data signals in analog and/or digital form can in particular also be understood within the meaning of signal processing. Thus, the present invention or respectively the individual components of the present invention can be suited to receiving analog and/or digital (data) signals, storing same in the central memory with assignment of a signal identification number, and further processing by means of functional units so that a special function of the commercial vehicle is for example controllable by means of a functional unit result. The functional unit result is thereby passed back via the central memory and a signal output of the central memory. The central memory works in the sense of a storage unit storing and relaying signals/data signals, whereby the functional units in particular have access to all stored/saved signals. The extraction, selection and/or identification of a signal by a functional unit ensues on the basis of the assigned signal identification number. Thus, a signal identification number, or at least part of a specific signal identification number respectively, is specified for a functional unit such that the functional unit can identify, select and read out from the central memory a corresponding signal assigned thereto for further processing.

An accompanying aspect of the invention relates to a system for configuring a control module at set forth above. The system comprises at least one signal input, at least one signal output, a display unit, a graphical user interface able to be displayed on the display unit, and at least one input device. The functional unit can be composed of individual functional unit components based on the user interface. The functional unit components can be provided in the form of sub-function units.

The system can moreover comprise a diagnostic unit suited to transmitting a configuration to the control module. In particular, the configuration signal input and the configuration signal output of the system can be provided on the diagnostic unit. The diagnostic unit of the system can preferably be connectable to the display unit and the input device via a USB, WLAN, LAN, Bluetooth or other similar interface. It is further conceivable for the system with the display unit and the input device to be provided as an appropriately designed computer or PC.

The system is provided with at least one configuration signal input as well as at least one configuration signal output so that a suitable connection can be established between the configuration system and the control module to be configured. It is thus possible to advantageously adapt or respectively modify a configuration in application-specific manner on the basis of the display unit and the graphical user interface by means of the at least one input device. Providing a simplified form of the control module configuration is possible on the basis of the control module configuration system. The control module can thus be advantageously adapted and modified not only solely by the control module manufacturer but also, for example, directly by the manufacturer of the commercial vehicle.

The at least one functional unit can be composed of individual functional unit components based on the user interface. The system can preferentially provide a plurality of functional unit components as standard. The functional unit components are thereby designed as sub-function units. These sub-function units can for example represent simple basic mathematical operations such as e.g. addition, subtraction, multiplication and division, as well as basic relational "and"/"or" operations, integral formation, differential calculus and the like for signal processing.

The functional unit components are components able to be modularly installed or assembled respectively as combinations of different sub-function units in order to obtain a desired functional unit. An individual functional unit can preferentially be compiled by means of the system, for example via "click-and-drop." So doing also facilitates the customary users of a control module, particularly commercial vehicle manufacturers, in making a specific control module configuration based on the inventive configuration system. The functional units can in this sense represent more complicated mechanisms for signal processing, preferably composed of simpler sub-function units. A plurality of sub-function units as well as standard applicable functional units can be provided by the inventive system for configuring the control module. The system can advantageously enable the user of the system to configure a control module.

According to one embodiment of the inventive system, a plurality of modular functional units are provided so as to enable a change of configuration by the exchanging of individual functional units, particularly functional units already provided by the system. The inventive system is provided with a number of arbitrarily applicable functional units for the ad hoc configuration of the control module. The given functional units can in particular be compiled from individual functional unit components. The user can thus already draw from a pool of functional units/sub-function units without having to apply essential computer science programming knowledge for the configuration of the control module or a functional unit respectively. Instead, the user can configure the control module in any way on the basis of the given functional units. Alternatively, the user can construct his own functional units from functional unit components so as to configure the control module (fully) individually.

A further accompanying aspect of the invention provides a method for using the control module as described above. According to said method, a first step provides for the provision of at least one programmable functional unit which accesses the central memory and is allocated at least one signal identification number as a functional unit precondition so that the functional unit can identify and use a signal from the central memory by a signal identification number. In a second step, a signal identification number is assigned to at least one incoming signal. A third step provides for the at least one functional unit to compare the signal identification number of the at least one incoming signal to a predefined functional unit condition. The further processing of the signal by the functional unit occurs in a fourth step, particularly provided that the comparison of the signal identification number and the functional unit condition matches. A fifth step comprises the result of the functional unit being returned to the central memory. In a sixth step, the functional unit result is output via the at least one signal output of the central memory.

In the sense of the present invention, the inventive method always assigns a signal coming into the central memory by means of the associated identification number, in particular an assigning to the respective signal source. A direct and clear link is thus given between e.g. a sensor as a signal source and a functional unit coupled to the central memory. An individual functional unit can be associated with a specific signal source based on the signal identification number, whereby the central memory serves as a type of collective memory for all the signals or data signals respectively.

In one embodiment, the at least one signal can be used further by a plurality of functional units. In particular, a plurality of functional units can be designed such that they access or respectively retrieve the same signal identification number from the central memory in order to further process the associated signal. Hence, a key setting or a sensor reading, for example, can be used by a plurality of functional units. A plurality of special commercial vehicle functions can thus be controlled by means of the results of the functional units based on an individual signal/data signal.

According to a further embodiment, the signal identification number is assigned to the at least one incoming signal as a function of the signal source. An origin-dependent signal identification number is thus assigned to a signal upon its being received in the central memory. The origin-dependent signal identification number enables an explicit correlation between the signal origin and the result produced by the functional unit. There is thus dedicated signal processing in the sense of the invention. Each signal source is thereby preferably associated with at least one explicitly identifiable segment of the signal identification number to be assigned. A targeted signal assignment, signal forwarding and signal processing advantageously occurs even in the case of the central memory which is generally freely accessible to all the functional units.

Moreover, it is also possible on the basis of the origin-dependent signal identification number to define a specific vehicle state. For example, a temperature sensor in a drive unit of the commercial vehicle can be differentiated from a temperature sensor in the interior of the commercial vehicle in order to selectively switch special functions of the commercial vehicle on or off as needed. A vehicle state is thus clearly identifiable particularly by means of a filter upstream of the functional unit. The filter can for example prevent the signal from being relayed from the central memory to the functional unit if a desired vehicle state is not present.

According to a further embodiment, the at least one functional unit provided is interchangeable as needed by being replaced with another given functional unit. In the sense of the invention, the functional units are in particular inter-changeable in modular fashion. Thus, an interchanging of functional units is advantageously possible in order to appropriately adapt or respectively configure the inventive control module.

A further accompanying aspect of the present invention relates to a motor vehicle control unit comprising a control module as described above. A control unit, in particular a central motor vehicle control unit, can thus be supplemented by the control module according to the invention so that a standard motor vehicle can be reconfigured into a suitably designed commercial vehicle. A motor vehicle comprising a control module in accordance with invention can in this way be provided.

It can in this sense be provided for the motor vehicle control unit to comprise the control module in parallel with a central standard control module of a motor vehicle or commercial vehicle respectively. Alternatively, the central or respectively standard control module can be supplemented by the inventive control module such that the results of the at least one functional unit can be transferred into the (central) control unit of the commercial vehicle via the central memory.

The following will reference the accompanying schematic drawing in defining the invention in greater detail on the basis of exemplary embodiments. Further embodiments of the inventive subject matter are thereby not to be excluded in the context of the present invention.

Shown schematically:

FIG. 1: a structural embodiment of the control module for use in commercial vehicles.

FIG. 1 depicts the structure of a control module 1 according to one exemplary embodiment. The control module 1 according to FIG. 1 is designed with a central memory 10 having three signal inputs 20 and three signal outputs 40. A filter 30 is in each case disposed upstream of the signal outputs 40 so that a signal from the central memory must first pass the associated filter 30 of the respective signal output 40. By so doing, a signal from the central memory 10 can only exit the control module via the signal outputs 40 under predefined conditions, preferably as a function of a vehicle state. Thus, the passage of a signal from the central memory 10 into a central control unit of a vehicle or commercial vehicle respectively or to a special function of the commercial vehicle can be selectively restricted.

Furthermore, the signal inputs 20 and the signal outputs 40 can be designed as CAN, LIN, USB, WLAN, LAN and/or Bluetooth interfaces. So doing achieves high compatibility with standard motor vehicle interfaces. The signal inputs 20 and signal outputs 40 may be designed as analog and/or digital interfaces. Moreover, in particular the signal inputs 20 or signal input interfaces respectively can be furnished with supplementary signal processing and/or signal conditioning. Potential disruptive factors such as signal noise or the like can thus for example be eliminated prior to entering the signal memory 10.

In accordance with FIG. 1, signals are in this sense introduced into the central memory 10 from e.g. sensors disposed externally of the control module 1 (see dotted arrows) via signal inputs 20. Upon being received in the central memory 10, the at least one signal is assigned a signal identification number. The signal, data signal respectively, is then stored or saved in the central memory 10.

As per FIG. 1, the control module 1 is designed with two functional units 51; 52. The functional units 51; 52 are connected to the central memory 10 as modules. The functional units 51; 52 each comprise a signal input and a signal output with respect to the central memory 10. A functional unit 51; 52 can thus retrieve or respectively call up a signal from the central memory 10. A result of a functional unit 51; 52 can likewise be transferred to the central memory. In this sense, the central memory represents a fully accessible storage location from which the functional units 51; 52 are able to access all the stored signals or data, whereby selective access by the functional units 51; 52 ensues on the basis of the signal identification numbers. The functional units 51; 52 retrieve the data or signals respectively for further processing particularly on the basis of the distinctly assigned signal identification number. There is thus a clear and selective retrieval of specific signals for signal processing by the respective functional units 51; 52. Furthermore, a result of a functional unit 51; 52 can be fed back into the central memory 10. The functional unit can in each case distinctly identify a signal on the basis of the signal identification number.

The functional units 51; 52 are moreover each equipped with a filter 30. In particular, a filter 30 is in each case connected upstream of the functional units 51; 52 according to FIG. 1. Thus, the processing of a specific signal can be made contingent in particular on a vehicle status or vehicle state, e.g. a temperature, a dynamic driving condition, a sensor setting or the like. If such a precondition is not met according to the configuration of the respective filter 30, signal processing can for example be prevented.

It can furthermore be provided for at least one first functional unit 51 to be a preprogrammed or respectively preconfigured functional unit 51, whereby the second functional unit 52 is a configurable functional unit 52. Thus, any desired degree of control module 1 adaptability can be given to e.g. the respective commercial vehicle manufacturer. Non-modifiable standard functions for commercial vehicles or special-purpose vehicles can be provided in the control module along with freely configurable functional units. The control module can advantageously also be fully modularly configurable in terms of the functional units 51; 52, for example by a commercial vehicle manufacturer or a commercial vehicle user. In this case, both functional units 51; 52 can be provided as fully configurable as per FIG. 1.

Of course it can also be provided in the sense of the present invention for other locally present signals or data to be able to be fed into the central memory (not depicted in FIG. 1). Conceivable to this end is to appropriately connect e.g. external storage media to the central storage. Signals or data can thus be steadily fed into or respectively be present in the central memory independent of sensors or keys, etc. It is thus also conceivable to specify specific (pre)conditions for the signal processing by the functional units 51;52 on the basis of (data) signals to be locally supplied or respectively permanently available locally. The local signals/data signals can be fed directly into the central memory to that end, whereby a signal identification number is in each case preferably assigned to the respective signal/data signal.

The invention claimed is:

1. A control module for use in motor vehicles comprising a plurality of signal inputs, a plurality of signal outputs and a central memory connected to at least one functional unit for the further processing of incoming signals, wherein the central memory is configured to assign a signal identification number to at least one signal received in the central memory such that the signal can be identified and used further by the at least one functional unit on the basis of the signal identification number, wherein the at least one functional unit is associated with a specific signal source based on the signal identification number, wherein the at least one functional unit is modularly interchangeable, and wherein the at least one functional unit corresponds to at least one filter connected upstream of the at least one functional unit such that a signal can be linked to a status condition of the motor vehicle and the at least one filter prevents the signal from being passed to the respective functional unit if the desired vehicle status is not present.

2. The control module according to claim 1, wherein the central memory is connected to a plurality of functional units.

3. The control module according to claim 1, wherein the at least one signal can be used further by a plurality of functional units in parallel.

4. The control module according to claim 1, wherein at least one of the signal inputs and at least one of the signal outputs is designed as an CAN, LIN, USB, WLAN, LAN and/or Bluetooth interface.

5. A motor vehicle control unit comprising a control module according to claim 1.

6. A system comprising:

control module for use in motor vehicles comprising a plurality of signal inputs, a plurality of signal outputs and a central memory connected to at least one functional unit for the further processing of incoming signals, at least one configuration signal input, at least one configuration signal output, a display unit, a graphical user interface able to be displayed on the display unit, and at least one input device, wherein the at least one functional unit is composed of individual functional unit components based on the graphical user interface, wherein the individual functional unit components comprise sub-function units, wherein the central memory is configured to assign a signal identification number to at least one signal received in the central memory such that the signal can be identified and used further by the at least one functional unit on the basis of the signal identification number, wherein the at least one functional unit is associated with a specific signal source based on the signal identification number, wherein the at least one functional unit is modularly interchangeable, and wherein the at least one functional unit corresponds to at least one filter connected upstream of the at least one functional unit such that a signal can be linked to a status condition of the motor vehicle and the at least one filter prevents the signal from being passed to the respective functional unit if the desired vehicle status is not present.

7. The system according to claim 6, wherein a plurality of modular functional units are provided so that a change of configuration is enabled by exchanging individual functional units.

8. A method for using a control module, the method comprising:

providing at least one programmable functional unit which accesses a central memory and is allocated at least one signal identification number by the central memory as a functional unit precondition so that the functional unit can identify and use a signal from the central memory by a signal identification number, wherein the at least one functional unit is associated with a specific signal source based on the signal identification number, assigning a signal identification number to at least one incoming signal, filtering, by at least one filter connected upstream of the at least one functional unit, the at least one incoming signal based on whether the at least one incoming signal can be linked to a status condition of the motor vehicle, the at least one filter preventing the at least one incoming signal from being passed to the at least one functional unit if the desired vehicle status is not present, comparing, by at least one functional unit, the signal identification number of the at least one incoming signal to a predefined functional unit condition, further processing the signal by the functional unit, provided the comparison of the signal identification number and the functional unit condition matches, returning the functional unit result to the central memory, and outputting the functional unit result via the at least one signal output of the central memory.

9. The method according to claim 8, wherein the at least one signal can be used further by a plurality of functional units.

10. The method according to claim 8, wherein the at least one signal identification number is assigned to the at least one incoming signal as a function of the signal source.

11. The method according to claim 8, wherein the at least one functional unit provided is interchangeable as needed by being replaced with another given functional unit.

* * * * *